(12) United States Patent
Park et al.

(10) Patent No.: US 8,284,567 B2
(45) Date of Patent: Oct. 9, 2012

(54) MOBILE TERMINAL INCLUDING INPUT DEVICE HAVING PIEZOELECTRIC SENSOR AND METHOD OF OPERATING THE SAME

(75) Inventors: Sang Chun Park, Gyeonggi-do (KR); Young Mok Jeun, Seoul (KR); Hong Bae Kim, Gyeonggi-do (KR); Byoung Soo Lee, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 301 days.

(21) Appl. No.: 12/573,988

(22) Filed: Oct. 6, 2009

(65) Prior Publication Data
US 2010/0085724 A1  Apr. 8, 2010

(30) Foreign Application Priority Data
Oct. 6, 2008  (KR) .................. 10-2008-0097883

(51) Int. Cl.
*H05K 7/16* (2006.01)
(52) U.S. Cl. ........ 361/810; 310/317; 345/419; 455/522; 340/443

(58) Field of Classification Search .............. 310/365, 310/328, 317, 323.8; 345/173, 174, 175, 345/419, 207, 6; 455/575.1, 41.2, 522, 556.1, 455/456.3, 517, 414, 574; 340/545.1, 541, 340/443, 444, 10.1; 713/320; 361/42, 679.21, 361/679.22, 679.23, 679.27, 679.02, 679.41, 361/810
See application file for complete search history.

(56) References Cited

U.S. PATENT DOCUMENTS

| 7,962,184 B2 * | 6/2011 | Jung ........................ 455/575.1 |
| 2009/0201260 A1 * | 8/2009 | Lee et al. ...................... 345/173 |
| 2009/0289529 A1 * | 11/2009 | Ito et al. ........................ 310/365 |

* cited by examiner

*Primary Examiner* — Hung Duong
(74) *Attorney, Agent, or Firm* — Cha & Reiter, LLC

(57) ABSTRACT

A mobile terminal including an input device using a piezoelectric sensor and a method of operating the mobile terminal are provided. The mobile terminal includes: a body; and a piezoelectric sensor unit including a first piezoelectric sensor positioned at a first side surface of the body and to which at least one function key for performing a first specific function corresponding to a user function of the mobile terminal is set and a second piezoelectric sensor positioned at a second side surface of the body and to which at least one function key for performing a second specific function different to the first specific function is set.

17 Claims, 5 Drawing Sheets

MOBILE TERMINAL INCLUDING INPUT DEVICE HAVING PIEZOELECTRIC SENSOR AND METHOD OF OPERATING THE SAME

CLAIM OF PRIORITY

This application claims priority to and the benefit of the earlier filing date, pursuant to 35 USC 119, to that Korean Patent Application No. 10-2008-0097883 filed in the Korean Intellectual Property Office on Oct. 6, 2008, the entire contents of which are incorporated herein by reference.

BACKGROUND OF THE INVENTION

1. Field of the Invention

The present invention relates to an input device of a mobile terminal, and more particularly, to a mobile terminal embodying function keys positioned at a side surface of the mobile terminal using a piezoelectric sensor.

2. Description of the Related Art

In general, as various functions are added to a mobile terminal, operation of the mobile terminal becomes increasingly complex. Nowadays, mobile terminals provide various functions such as message transmission and reception, wireless Internet, phonebook management, schedule management, photographing, audiovisual communication, recording, and MP3 playing in addition to a communication function. Such a mobile terminal has function keys or hotkeys for rapidly executing specific functions of the above-described functions. For example, the mobile terminal may have a volume key, a camera key, and an MP3 key in a side surface.

Nowadays, a mobile terminal having a simple design is preferred. However, function keys or hotkeys provided in a side surface of a conventional mobile terminal are formed in a button type in which a key protrudes to the outside, and thus disturbing the simple design of the mobile terminal. Further, the conventional mobile terminal determines locations of the function keys or hotkeys in consideration of user convenience. However, in a conventional mobile terminal, convenient locations of the function keys or hotkeys are generally determined in consideration of a user holding the mobile terminal with the right hand and operating the keys with the right hand (typically, a right handed user), and thus the conventional mobile terminal is inconvenient to a user holding the mobile terminal in the left hand and operating with the left hand (typically, a left handed user).

SUMMARY OF THE INVENTION

The present invention provides a mobile terminal including an input device having a piezoelectric sensor and a method of operating the mobile terminal that can simplify the design of the mobile terminal and improve user convenience by embodying button type function keys positioned at a side surface of the mobile terminal using a piezoelectric sensor.

In accordance with an aspect of the present invention, a mobile terminal includes: a body; and a piezoelectric sensor unit including a first piezoelectric sensor positioned at a first side surface of the body and to which at least one function key for performing a corresponding first specific function corresponding to a desired user function is set and a second piezoelectric sensor positioned at a second side surface of the body and to which at least one function key for performing a corresponding second specific function different that the first specific function is set.

In accordance with another aspect of the present invention, a method of operating a mobile terminal in which a first piezoelectric sensor and a second piezoelectric sensor are positioned at different side surfaces includes: setting a first specific function corresponding to a user function of the mobile terminal to the first piezoelectric sensor; and setting a second specific function different to the first specific function to the second piezoelectric sensor.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Figure 1A:
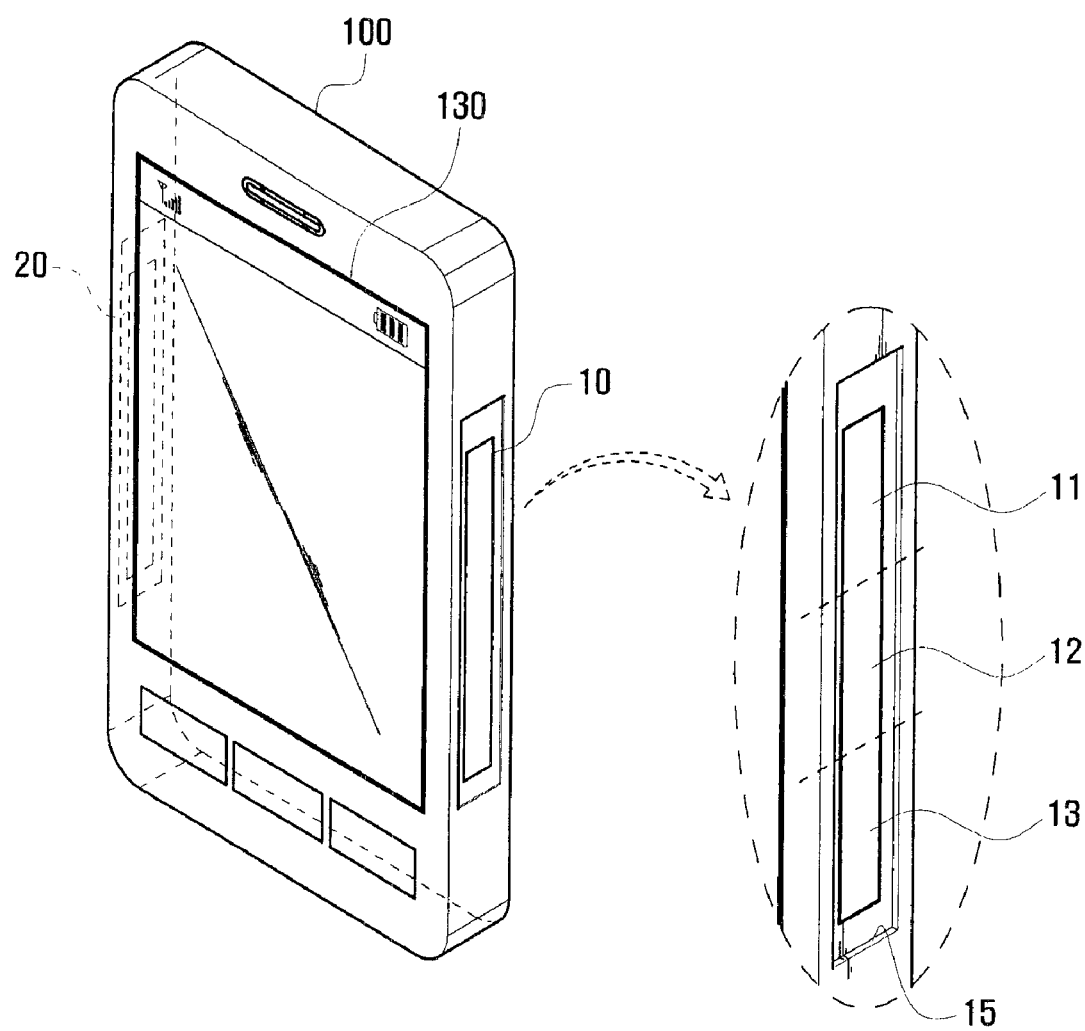
FIG. 1A is a perspective view illustrating a mobile terminal according to an exemplary embodiment of the present invention.

Embodiments of the present invention are described in detail with reference to the accompanying drawings. The same reference numbers are used throughout the drawings to refer to the same or like parts. The views in the drawings are schematic views only, and are not intended to be to scale or correctly proportioned. Detailed descriptions of well-known functions and structures incorporated herein may be omitted to avoid obscuring the subject matter of the present invention.

While the present invention may be embodied in many different forms, specific embodiments of the present invention are shown in drawings and are described herein in detail, with the understanding that the present disclosure is to be considered as an exemplification of the principles of the invention and is not intended to limit the invention to the specific embodiments illustrated.

In the following description, for convenience of description, a mobile terminal according to an exemplary embodiment of the present invention is described as a mobile communication terminal; however the present invention is not limited thereto. The mobile terminal according to the present exemplary embodiment may be any information and/or communication device or multimedia device, such as a mobile phone, personal digital assistant (PDA), smart phone, International Mobile Telecommunication 2000 (IMT-2000) terminal, code division multiple access (CDMA) terminal, wideband code division multiple access (WCDMA) terminal, Global System for Mobile Communication (GSM) terminal, general packet radio service (GPRS) terminal, universal mobile telecommunication service (UMTS) terminal, digital broadcasting terminal, and applications thereof.

An "operation method of a piezoelectric sensor unit" may be one of a right hand method and a left hand method, and functions that are set to a first piezoelectric sensor and a second piezoelectric sensor mounted in a side surface of the mobile terminal can be changed according to the operation method of the piezoelectric sensor unit. A "right hand method is a method in which a user holds the mobile terminal with the right hand and operates the side buttons of the mobile terminal with the right hand, and a "left hand method" is a method in which a user holds the mobile terminal with the left hand and operates the side buttons of the mobile terminal with the left hand.

A "function key" is a key that is set to provide a specific function in order to avoid performing multiple steps necessary for operation of a lower-level menu in a menu type program and similar in operation as a "hotkey" for quickly executing the specific function. Hotkeys are known in the art of computer design as allowing the execution of one or more related functions with the press of a single button or the pressing of at least two buttons concurrently (e.g., Alt, Ctl, delete for resetting a WINDOWS-based operating system. WINDOWS is a registered trademark of the Microsoft Corporation, USA.

In the present invention, a bar type mobile terminal is exemplified; however the present invention is not limited to this form. That is, a mobile terminal according to the present invention can be formed in various types, such as a folder type and a slide type.

Figure 1B:
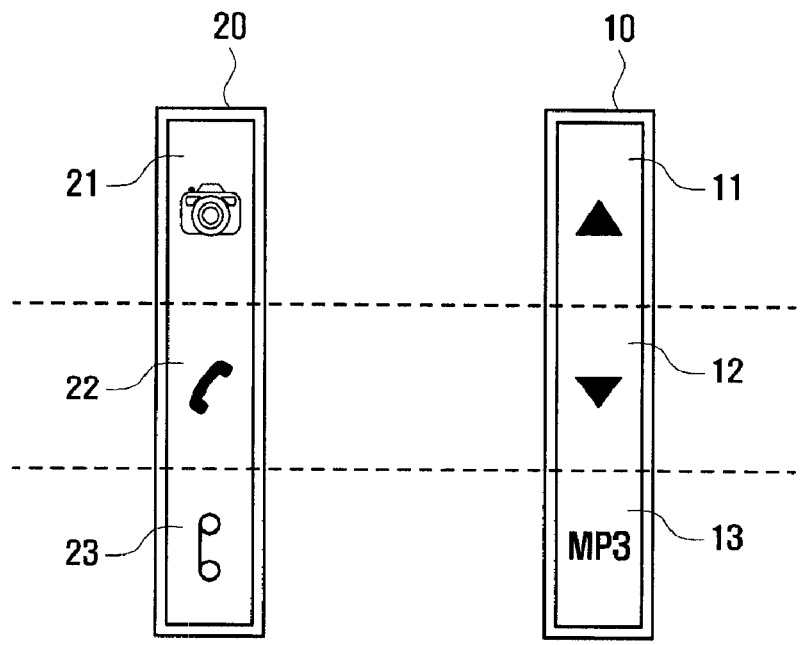
FIG. 1B is a diagram illustrating exemplary functions that are set to a first piezoelectric sensor and a second piezoelectric sensor of the mobile terminal of FIG. 1A in accordance with an aspect of the invention.
Figure 1C:
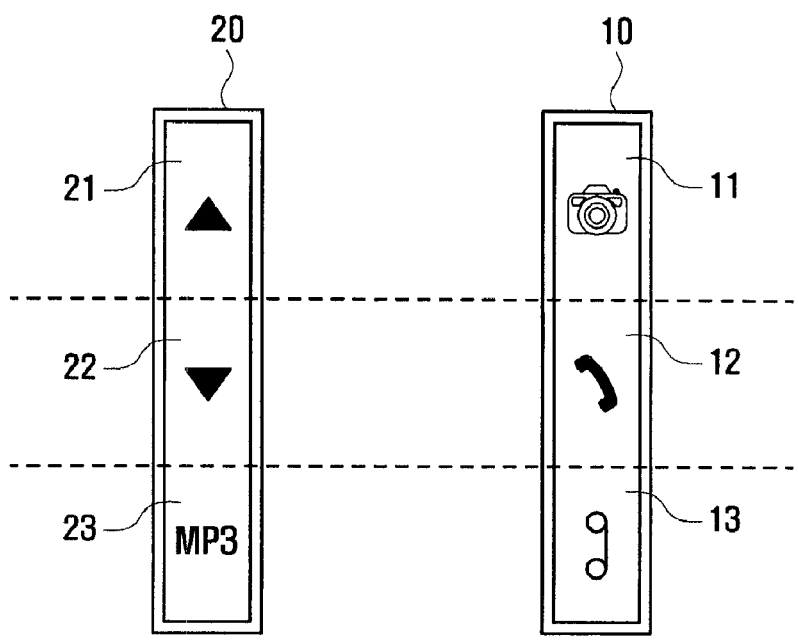
FIG. 1C is a diagram illustrating functions that are set to a first piezoelectric sensor and a second piezoelectric sensor of the mobile terminal of FIG. 1A in accordance with another aspect of the invention.

FIG. 1A is a perspective view illustrating a mobile terminal according to an exemplary embodiment of the present invention. FIG. 1B is a diagram illustrating functions that are set to a first piezoelectric sensor and a second piezoelectric sensor when an operation method of a piezoelectric sensor of the mobile terminal of FIG. 1A is a first (e.g., right hand) method. FIG. 1C is a diagram illustrating functions that are set to a first piezoelectric sensor and a second piezoelectric sensor when an operation method of a piezoelectric sensor of the mobile terminal of FIG. 1A is a second (e.g., left hand) method. As would be recognized, the FIG. 1B may also represent a left hand method and FIG. 1C may also represent a right hand method, dependent upon the user's preference.

Referring to FIGS. 1A to 1C, a body of a mobile terminal 100 according to the present exemplary embodiment has a rectangular form. A display unit 130 is positioned at a front surface of the body, and when a user views a front surface of the display unit 130, a first piezoelectric sensor 10 is positioned at a right side surface of the mobile terminal 100 with respect to the user (hereinafter, a first side surface), and a second piezoelectric sensor 20 is positioned at a side surface of the mobile terminal 100 at an opposite side to the first side surface, i.e. a left side surface with respect to the user (hereinafter, a second side surface).

Here, a piezoelectric sensor is a sensor in which a potential difference is generated between opposite side surfaces of the piezoelectric sensor when one side surface is electrified as a positive electrode and the opposite side surface is electrified as a negative electrode by electric charges generated by extending or compressing one side of opposing panels having a predetermined separation distance. The potential difference generated between the opposite side surfaces is proportional to an applied pressure, and electric charges (signals) generated by a pressure change are not sustained for a long period and quickly disappear. Accordingly, the piezoelectric sensor can determine a pressure application point by determining a change of a potential difference. Further, the piezoelectric sensor can be formed in a thin film form factor.

The first piezoelectric sensor 10 and the second piezoelectric sensor 20 are mounted in the first side surface and second sides side, respectively, of the mobile terminal 100, and functions corresponding to at least one user function of the mobile terminal 100 are set to the first piezoelectric sensor 10 and the second piezoelectric sensor 20, as shown in FIG. 1A. For example, a volume key function for adjusting a volume, a camera key function for activating a camera function, a record key function for activating a recording function, and an audiovisual communication key function for activating an audiovisual communication function may be set to the first piezoelectric sensor 10 and the second piezoelectric sensor 20. The first piezoelectric sensor 10 and the second piezoelectric sensor 20 can each be formed as a thin film type piezoelectric sensor in order to simplify a design of the mobile terminal 100. At least one of the first piezoelectric sensor 10 and the second piezoelectric sensor 20 can be divided into a plurality of areas, and different user functions can be set to each area of the plurality of areas. For example, as shown in FIG. 1B, the first piezoelectric sensor 10 can be divided into a first area 11 to which a volume-up key is set, a second area 12 to which a volume-down key is set, and a third area 13 to which an MP3 key is set. In this case, when a potential difference is generated at a specific location of the first piezoelectric sensor 10, the mobile terminal 100 can determine an area of the first piezoelectric sensor 10 that includes the location at which the potential difference is generated and perform the function that is set corresponding to the determined area. In this way, in the present invention, because a function key is set to a predetermined area and not to a precise location, it is unnecessary for a user to touch a precise location in order to execute a specific function, thereby improving user convenience.

Functions that are set to the first piezoelectric sensor 10 and the second piezoelectric sensor 20 can be changed according to an operation method of a piezoelectric sensor unit selected by a user. For example, when a volume key that is frequently used while performing a phone call communication is positioned at the first side surface, the volume key provides user convenience for a right handed user, whereas for a left handed user, the volume key provides user convenience when it is positioned at the second side surface. Referring to FIGS. 1B and 1C, specifically, when the user selects an operation method of a first method (e.g., right hand method), first specific functions, for example a volume-up key, volume-down key, and MP3 key, are set to a first area 11, second area 12, and third area 13, respectively, of the first piezoelectric sensor 10, and second specific functions, for example a camera key, an audiovisual communication key, and a record key, are set to a first area 21, second area 22, and third area 23, respectively, of the second piezoelectric sensor 20, as shown in FIG. 1B. Alternatively, when the user selects an operation method of a second method (e.g., left hand method), a camera key, an audiovisual communication key, and a record key are set to the first area 11, second area 12, and third area 13, respectively, of the first piezoelectric sensor 10, and a volume-up key, a volume-down key, and an MP3 key are set to the first area 21, second area 22, and third area 23, respectively, of the second piezoelectric sensor 20, as shown in FIG. 10. In the present invention, functions that are set to the first piezoelectric sensor 10 and the second piezoelectric sensor 20 can be changed according to an operation method of the piezoelectric sensor unit, thereby providing user convenience and flexibility to a right handed user and a left handed user. In addition, although FIGS. 1B and 1C show particular arrangements of button configurations, it would be understood that a user may alter the button configurations without altering the scope of the invention.

A first recess 15 for mounting the first piezoelectric sensor 10 and a second recess similar to the first recess 15 (not shown), for mounting the second piezoelectric sensor 20 are formed in the first side surface and the second side surface, respectively, of the mobile terminal 100 (see FIG. 1A). The first recess 15 is formed in a similar shape to the first piezoelectric sensor 10, and may be formed having a similar size to, or greater size than, the first piezoelectric sensor 10. Similarly, the second recess (not shown) may be formed having a similar size to, or greater size than, the second piezoelectric sensor 20. Further, it is preferable that the first piezoelectric sensor 10 and the second piezoelectric sensor 20 are mounted so as not to protrude from a corresponding surface of the mobile terminal 100, i.e. to have a height above the mounting surface of the corresponding recess less than that of the body surface, so that an erroneous operation caused by a user unintentionally pressing down the first piezoelectric sensor 10 or the second piezoelectric sensor 20 can be avoided.

The present invention is not limited to the first piezoelectric sensor 10 and the second piezoelectric sensor 20 each being divided into three areas. That is, the first piezoelectric sensor 10 and the second piezoelectric sensor 20 can be divided into two or more areas according to a designer's intention. Further, the described function keys that are set to the first piezoelectric sensor 10 and the second piezoelectric sensor 20 are examples only and the present invention is not limited thereto. That is, various function keys, such as a text messaging key, digital broadcasting key, and Bluetooth key, can be set to either the first piezoelectric sensor 10 or the second piezoelectric sensor 20 according to a user's requirements.

In the foregoing description, the input device using a piezoelectric sensor according to an exemplary embodiment of the present invention is described. A configuration of the mobile terminal 100 according to an exemplary embodiment of the present invention is described hereinafter.

Figure 2:
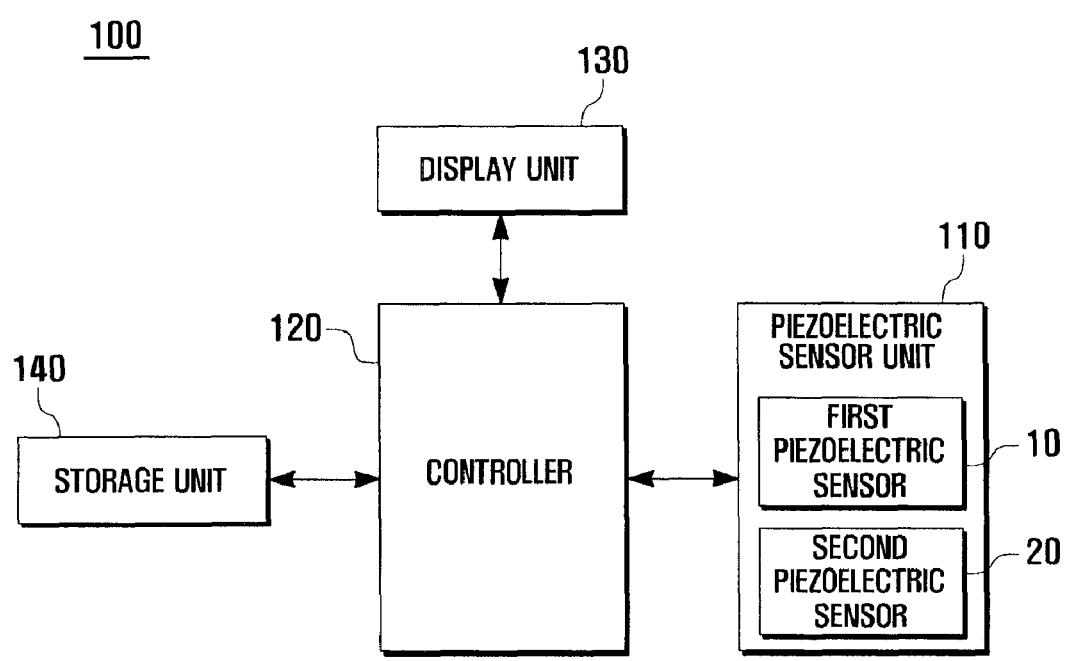
FIG. 2 is a block diagram illustrating a configuration of the mobile terminal of FIG. 1A.

FIG. 2 is a block diagram illustrating a configuration of the mobile terminal 100 of FIG. 1A.

Referring to FIG. 2, the mobile terminal 100 includes a piezoelectric sensor unit 110, a controller 120, the display unit 130, and a storage unit 140.

The piezoelectric sensor unit 110 includes the first piezoelectric sensor 10 and the second piezoelectric sensor 20 and provides an output when a potential difference is generated in response to a pressure applied to a corresponding one of first and second sensors 10, 20. For example, each of the first and second piezoelectric sensors converts an applied pressure to a corresponding electrical signal.

The first piezoelectric sensor 10 is positioned at the first side surface of the mobile terminal 100, and the second piezoelectric sensor 20 is positioned at the second side surface opposite to the first side surface (as shown in FIG. 1A). Particularly, at least one function key for executing a first specific function corresponding to at least one user function of the mobile terminal 100 is associated with the first piezoelectric sensor 10 according to the present exemplary embodiment, and at least one function key for executing a second specific function, different than the first specific function, is associated with the second piezoelectric sensor 20. In addition, each of the first piezoelectric sensor 10 and the second piezoelectric sensor 20 may be divided into a plurality of areas. A function key for quickly performing a corresponding specific function may be associated with each of the divided areas. For example, the first piezoelectric sensor 10 and the second piezoelectric sensor 20 may each be divided into three areas, as shown in FIGS. 1B and 1C. The areas may be associated (i.e., set) with a volume-up key, a volume-down key, and an MP3 key (see first piezoelectric sensor 10, FIG. 1B), and each of a camera key, an audiovisual communication key, and a record key is associated with one of the divided areas of the second piezoelectric sensor 20 (FIG. 1B). However, the present invention is not limited to the illustrated configuration. That is, the first piezoelectric sensor 10 and the second piezoelectric sensor 20 can be divided into a plurality of areas according to a designer's intention, and various keys can be set to the divided areas. For example, the keys may be associated with a digital broadcasting key for activating digital broadcasting and a Bluetooth key for activating a short range wireless communication function using Bluetooth. It would be recognized that the areas may be associated with other functions selected by the user, The controller 120 controls general operations of the mobile terminal 100 and signal flow between elements of the mobile terminal 100, and may also perform a data processing function. Particularly, in the present exemplary embodiment, the controller 120 can change function keys according to an operation method of the piezoelectric sensor unit 110 set to a default value, or according to a preset and stored operation method of the piezoelectric sensor unit 110. Specifically, when an operation method of the piezoelectric sensor unit 110 is a right hand method, the controller 120 sets a first specific function, for example a volume-up key, volume-down key, and MP3 key, corresponding to a user function of the mobile terminal 100 to the first piezoelectric sensor 10, and sets a second specific function, different than the first specific function, for example a camera key, audiovisual communication key, and record key, to the second piezoelectric sensor 20 (See FIG. 1B). When a user changes an operation method of the piezoelectric sensor unit 110 to a left hand method, the controller 120 may set the first specific function to the second piezoelectric sensor 20 and the second specific function to the first piezoelectric sensor 10, as shown in FIG. 1C. For this, the operation method setting menu of the piezoelectric sensor unit 110 is activated, and the controller 120 controls a display to display a screen for selecting an operation method of the piezoelectric sensor unit 110. Thus, the user may select one of the right hand method and the left hand method, and the controller 120 stores the selected operation method in the storage unit 140.

The controller 120 can check change of a voltage of each area of the first and second piezoelectric sensors, and control function performance mapped to the each area which the voltage is changed. Each divided areas of first and second piezoelectric sensors includes output terminals for transmitting change of voltage to the controller 120.

In accordance with the principles of the invention, when pressure at least first and second piezoelectric sensors, the controller 120 determines which of the first and second piezoelectric sensors provides the electrical signal and determines a corresponding function based on the functions mapped to each of the first and second piezoelectric sensors. when a potential difference is generated in a plurality of the divided areas of the first piezoelectric sensor 10 or of the second piezoelectric sensor 20, for example if the user presses a peripheral point of two adjacent divided areas, the controller 120 determines that a location having the highest potential difference, i.e. a specific point at which electric charges are most concentrated, is pressed and executes a function that is set to an area corresponding to the specific point. The controller 120 may includes voltage comparison unit (not shown) for comparing input voltages from a plurality of the divided areas of the first piezoelectric sensor 10 or of the second piezoelectric sensor 20.

Further, a function may be preset such that, if the user repeats an input of the corresponding specific operation, the controller 120 controls the display to display a notification message requesting the user check an operation method of the piezoelectric sensor unit 110. For example, when an operation method of the piezoelectric sensor unit 110 is set to a left hand method, if the user performs an operation of activating a camera function by pressing the first area 11 of the first piezoelectric sensor 10, and then subsequently repeats two or more times the operation of activating the camera function, the controller 120 may determine that the user misunderstands the presently set operation method of the piezoelectric sensor unit 110. For example, in the above case, the user may desire to operate a volume-up function. However if the user erroneously believes that the presently set operation method is a right hand method, the user may erroneously press the first area 11 of the first piezoelectric sensor 10 multiple times due to misunderstanding the presently set operation method. The controller 120 then controls the display to output a message notifying the user of a possible erroneous understanding of the presently set operation method.

The storage unit 140 stores user data as well as programs necessary associated with one or more operating functions according to the present exemplary embodiment. The storage unit 140 includes a program area and a data area (not shown).

The program area stores a program for controlling general operations of the mobile terminal 100, an operating system (OS) for booting the mobile terminal 100, an application program necessary for reproducing a multimedia content, and application programs necessary for performing other optional functions, e.g., a camera function, a sound reproduction function, and an image or moving picture reproduction function. Particularly, the program area according to the present exemplary embodiment stores programs for controlling operations of the first piezoelectric sensor 10 and the second piezoelectric sensor 20.

The data area is an area for storing data generated according to use of the mobile terminal 100, and can store a phone book, an audio data, a corresponding content, and information corresponding to user data. Particularly, the data area according to the present exemplary embodiment stores an operation method of the piezoelectric sensor unit 110 selected by the user. The operation method may be one of a right hand method or a left hand method. Further, the data area stores data about a divided area of the first piezoelectric sensor 10 and of the second piezoelectric sensor 20, and stores information regarding the functions mapped to the divided areas. Such mapping information can be changed according to an operation method of the piezoelectric sensor unit 110. For example, when an operation method of the piezoelectric sensor unit 110 is set to a right hand method, a volume-up key, a volume-down key, and an MP3 key are mapped to areas of the first piezoelectric sensor 10, while a camera key, an audiovisual communication key, and a record key are mapped to areas of the second piezoelectric sensor 20. Conversely, when the operation method of the piezoelectric sensor unit 110 is set to a left hand method, a camera key, an audiovisual communication key, and a record key are mapped to areas of the first piezoelectric sensor 10, and a volume-up key, a volume-down key, and an MP3 key are mapped to areas of the second piezoelectric sensor 20.

The display unit 130 displays user data input by the user, function setting information, and various information provided to the user as well as various menu screens of the mobile terminal 100. The display unit 130 may be a liquid crystal display (LCD) or an organic light emitting diode (OLED) display. Further, when the display unit 130 is formed as a touch screen, the display unit 130 can be operated as an input means. Particularly, when a predetermined area of the first piezoelectric sensor 10 or the second piezoelectric sensor 20 is pressed, the display unit 130 according to the present exemplary embodiment can display a screen for performing the function that is associated with the pressed area. For example, when an area to which an audiovisual communication key is set is pressed, the display unit 130 displays a screen for performing audiovisual communication. When the user repeats a specific operation several times, the display unit 130 can display a message by the control of the controller 120 requesting the user to check the operation method of the piezoelectric sensor unit 110. For example, when the user continuously repeats two or more times operations of activating and terminating a camera function, the controller 120 may control the display unit 130 to display a message requesting a change of the operation method of the piezoelectric sensor unit 110, for example a message such as "Piezoelectric sensor operation method is set to left hand method. Please change operation method to right hand method".

Further, although not shown in FIG. 2, the mobile terminal 100 may further include elements having additional functions, such as an input unit, a camera module, a broadcasting reception module, an audio signal output device such as a speaker, an audio signal input device such as a microphone, and digital sound source reproduction module such as an MP3 module.

Figure 3:
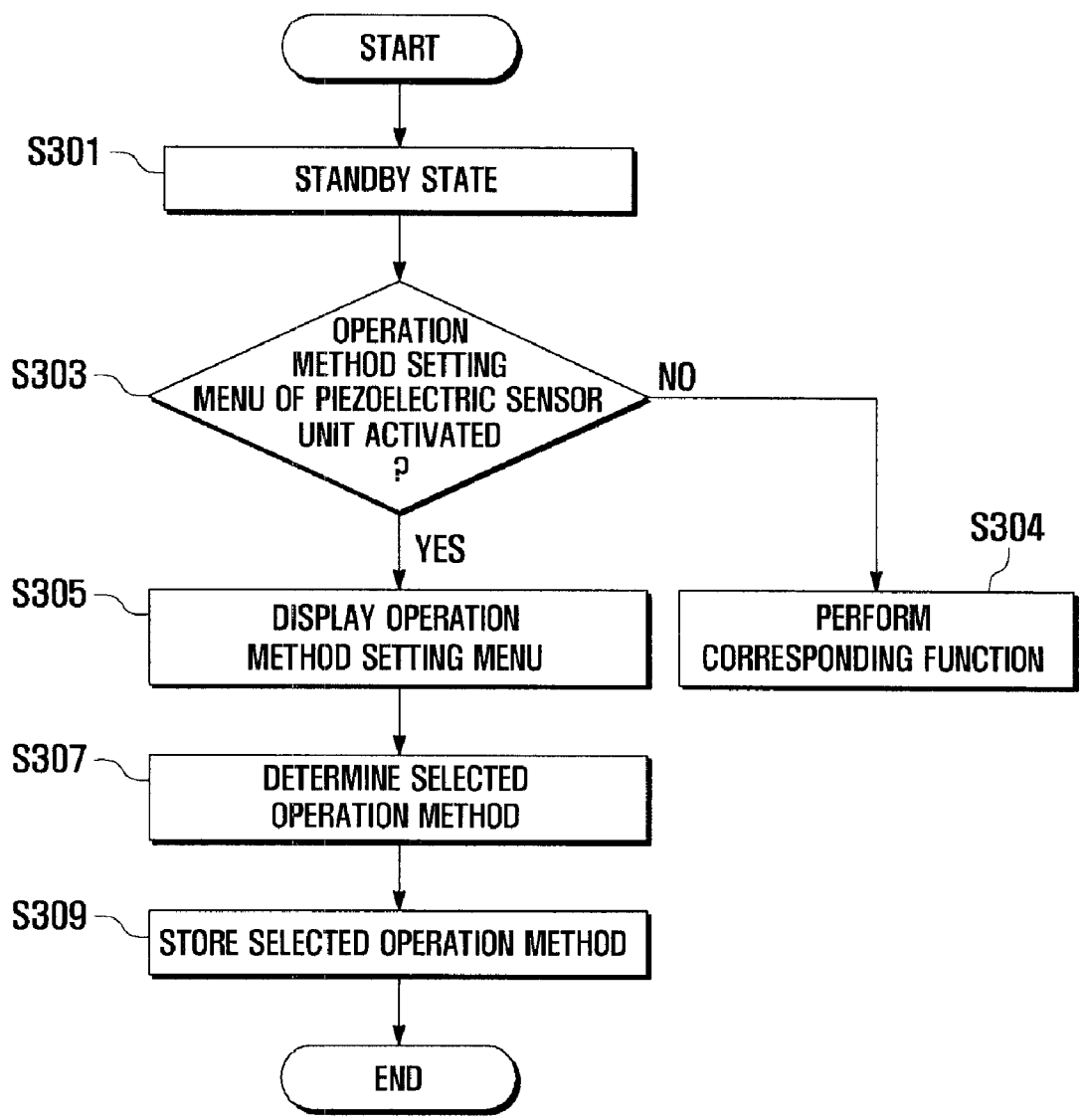
FIG. 3 is a flowchart illustrating an operation method setting process of a piezoelectric sensor unit of a mobile terminal according to exemplary embodiment of the present invention.
Figure 4:
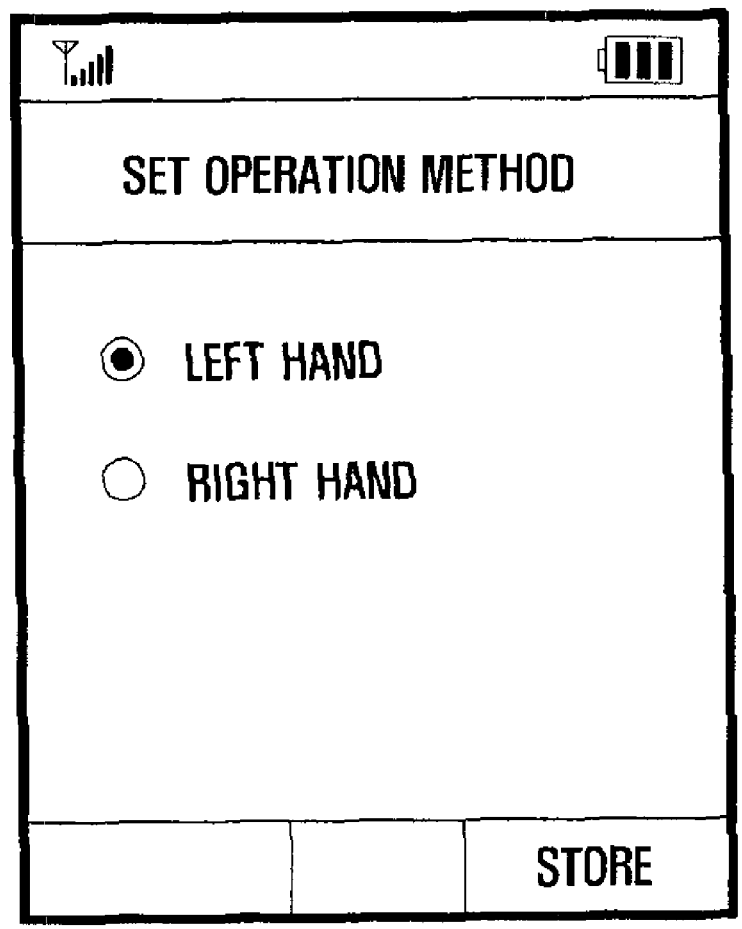
FIG. 4 illustrates a screen of an operation method setting menu of the piezoelectric sensor unit of the mobile terminal in the operation method setting process of FIG. 3.

FIG. 3 is a flowchart illustrating an operation method setting process of a piezoelectric sensor of a mobile terminal according to exemplary embodiment of the present invention. FIG. 4 illustrates a screen of an operation method setting menu of the piezoelectric sensor of the mobile terminal in the operation method setting process of FIG. 3.

Referring to FIGS. 3 and 4, when the mobile terminal 100 according to the present exemplary embodiment is turned on, the mobile terminal 100 is in a standby state (S301). The controller 120 determines whether an operation method setting menu of the piezoelectric sensor unit 110 is activated (S303). If an operation method setting menu of the piezoelectric sensor unit 110 is not activated, the controller 120 performs a corresponding function (S304). For example, the controller 120 can perform functions such as music reproduction, moving picture reproduction, and digital broadcasting reproduction according to a user selection, or sustain the standby state of step S301. In this case, the controller 120 controls the first piezoelectric sensor 10 and the second piezoelectric sensor 20 according to a preset default value of an operation method of the piezoelectric sensor unit 110, or according to a preset and stored operation method of the piezoelectric sensor unit 110. At least one of the first piezoelectric sensor 10 and the second piezoelectric sensor 20 can be divided into a plurality of areas and different user functions can be set to each divided area.

If an operation method setting menu of the piezoelectric sensor unit 110 is activated at step S303, the controller 120 controls the piezoelectric sensor unit 110 to display the operation method setting menu of the piezoelectric sensor unit 110 in the display unit 130 (S305), as shown in FIG. 4. The controller 120 determines which operation method of a left hand method and a right hand method is selected (S307). For example, if an input unit or the display unit 130 is a touch screen, the controller 120 determines which operation method is selected through a user touch input. When the user inputs a storage option positioned at a lower end of the right side of the display unit 130, the controller 120 stores the selected operation method of the piezoelectric sensor unit 110 in the storage unit 140 (S309). Thereafter, the controller 120 changes a function of the first piezoelectric sensor 10 and the second piezoelectric sensor 20 according to the stored operation method. For example, if a first specific function corresponding to a user function of the mobile terminal 100 is set to the first piezoelectric sensor 10 and a second specific function different to the first specific function is set to the second piezoelectric sensor 20 in a right hand method, when the user changes from a right hand method to a left hand method, the controller 120 sets the first specific function to the second piezoelectric sensor 20 and sets the second specific function to the first piezoelectric sensor 10.

As described above, according to the present invention, by embodying a conventional button type function key positioned at a side surface of the mobile terminal with a piezoelectric sensor, a design of the mobile terminal can be simplified and functions that are set to the piezoelectric sensor can be changed according to a user's selection, thereby providing identical user convenience regardless of whether the user is a left handed user or a right handed user.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

What is claimed is:

1. A mobile terminal comprising:
   a body; and
   a piezoelectric sensor unit comprising a first piezoelectric sensor positioned at a first side surface of the body and to which at least one first function key is set, the at least one first function key, responsive to a first applied pressure, for causing the first piezoelectric sensor to piezoelectrically generate a first signal for performing a first specific function corresponding to a user function of the mobile terminal, and a second piezoelectric sensor positioned at a second side surface of the body and to which at least one second function key is set, the at least one second function key, responsive to a second applied pressure, for causing the second piezoelectric sensor to piezoelectrically generate a second signal for performing a second specific function different than the first specific function.

2. The mobile terminal of claim 1, wherein the first side surface comprises a first recess for mounting the first piezoelectric sensor.

3. The mobile terminal of claim 2, wherein the first piezoelectric sensor is mounted in the first recess so as not to protrude above the first side surface.

4. The mobile terminal of claim 1, wherein the second side surface comprises a second recess for mounting the second piezoelectric sensor.

5. The mobile terminal of claim 4, wherein the second piezoelectric sensor is mounted in the second recess so as not to protrude above the second side surface.

6. The mobile terminal of claim 1, further comprising:
   a storage unit for storing an operation method of the piezoelectric sensor unit; and
   a controller for changing the first and second specific functions that are set to the first piezoelectric sensor and the second piezoelectric sensor, respectively, according to the operation method.

7. The mobile terminal of claim 6, wherein the controller sets, if an input signal for changing the stored operation method of the piezoelectric sensor unit is input through an input unit, the first specific function to the second piezoelectric sensor and sets the second specific function to the first piezoelectric sensor.

8. The mobile terminal of claim 1, wherein at least one of the first piezoelectric sensor and the second piezoelectric sensor is divided into a plurality of areas, and different user functions are set to each area of the plurality of areas.

9. The mobile terminal of claim 8, wherein the controller receives a signal from each of at least one of the areas, determines which of the areas is desired and performs a corresponding one of the different user functions associated with the determined area.

10. The mobile terminal of claim 1, wherein each of the first and second piezoelectric sensors converts the first and second applied pressures to a corresponding electrical signals as the first and second signals, respectively.

11. The mobile terminal of claim 10, wherein the controller determines which of the first and second piezoelectric sensors provides the electrical signal and determines a corresponding function based on the functions mapped to each of the first and second piezoelectric sensors.

12. The mobile terminal of claim 1, further comprising: a display unit for displaying information.

13. The mobile terminal of claim 12 wherein the display unit displays a predetermined menu for selection of operation of the first and second piezoelectric sensors.

14. The mobile terminal of claim 13, wherein functions associated with the operations of the first and second piezoelectric sensors are predetermined.

15. The mobile terminal of claim 14, wherein functions associated with the operations of the first and second piezoelectric sensors are determined by a user.

16. A mobile terminal comprising:
   a body; and
   a piezoelectric sensor unit comprising a first piezoelectric sensor positioned at a first side surface of the body and to which is set at least one function key for performing a first specific function corresponding to a user function of the mobile terminal, and a second piezoelectric sensor positioned at a second side surface of the body and to which is set at least one function key for performing a second specific function different than the first specific function,
   wherein at least one of the first side surface and the second side surface includes a recess for mounting the respective piezoelectric sensor associated with the first or second side surface.

17. The mobile terminal of claim 16, wherein the respective piezoelectric sensor is mounted in the recess so as not to protrude above the associated first or second side surface.

* * * * *